(12) United States Patent
Rauwolf et al.

(10) Patent No.: US 10,837,468 B2
(45) Date of Patent: Nov. 17, 2020

(54) MACHINE TOOL

(71) Applicant: HOERBIGER AUTOMATISIERUNGSTECHNIK HOLDING GMBH, Altenstadt (DE)

(72) Inventors: Martin Rauwolf, Schongau (DE); Bernhard Russ, Peiting (DE); Andreas Socher, Altenstadt (DE)

(73) Assignee: HOERBIGER AUTOMATISIERUNGSTECHNIK HOLDING GMBH, Altenstadt (DE)

( * ) Notice: Subject to any disclaimer, the term of this patent is extended or adjusted under 35 U.S.C. 154(b) by 0 days.

(21) Appl. No.: 16/266,643

(22) Filed: Feb. 4, 2019

(65) Prior Publication Data

US 2019/0170166 A1 Jun. 6, 2019

Related U.S. Application Data

(63) Continuation of application No. PCT/EP2017/069273, filed on Jul. 31, 2017.

(30) Foreign Application Priority Data

Aug. 8, 2016 (DE) .................. 10 2016 114 635

(51) Int. Cl.
*F15B 15/08* (2006.01)
*B30B 15/16* (2006.01)
(Continued)

(52) U.S. Cl.
CPC ............ *F15B 15/088* (2013.01); *B23Q 5/033* (2013.01); *B23Q 5/26* (2013.01); *B30B 15/16* (2013.01);
(Continued)

(58) Field of Classification Search
CPC .......... F01B 1/062; F04B 23/02; B30B 15/16; F15B 15/149; F15B 15/088; B23Q 5/033; B23Q 5/26
See application file for complete search history.

(56) References Cited

U.S. PATENT DOCUMENTS 6,959,581 B2 11/2005 Kanno

FOREIGN PATENT DOCUMENTS

| CN | 201836150 U | 5/2011 |
| CN | 202971412 U | 6/2013 |
(Continued)

OTHER PUBLICATIONS

International Search Report issued by the International Search Authority for corresponding Application No. PCT/EP2017/069273 dated Nov. 20, 2017 with an English translation.

*Primary Examiner* — Abiy Teka
(74) *Attorney, Agent, or Firm* — Dinsmore & Shohl LLP

(57) ABSTRACT

An electrohydraulic drive unit of a machine tool having a tool that can be moved up and down is provided and comprises a double-acting hydraulic cylinder-piston arrangement oriented in upright manner and having a piston projecting downwardly from the cylinder and being coupled with the tool, a valve block flanged to the cylinder at the upper end region thereof and having a servo suction valve, a hydraulic-fluid reservoir flanged to the valve block at a first hydraulic interface and a motor-pump unit having an electric motor and a hydraulic pump driven thereby and flanged to the valve block at a second hydraulic interface. A suction line, extends from the first hydraulic interface to the second hydraulic interface through the valve block.

13 Claims, 4 Drawing Sheets

(51) Int. Cl.

| | |
|---|---|
| *F04B 23/02* | (2006.01) |
| *B23Q 5/033* | (2006.01) |
| *B23Q 5/26* | (2006.01) |
| *F15B 15/14* | (2006.01) |
| *F15B 15/18* | (2006.01) |
| *F15B 13/04* | (2006.01) |
| *F15B 13/044* | (2006.01) |

(52) U.S. Cl.
CPC ............ *F04B 23/02* (2013.01); *F15B 15/149* (2013.01); *F15B 13/0401* (2013.01); *F15B 13/044* (2013.01); *F15B 15/18* (2013.01)

(56) References Cited

FOREIGN PATENT DOCUMENTS

| | | |
|---|---|---|
| CN | 204386973 U | 6/2015 |
| CN | 204725877 U | 10/2015 |
| CN | 104564865 B | 6/2016 |
| DE | 30 27 284 A1 | 2/1981 |
| DE | 102006021682 A1 | 11/2007 |
| DE | 20 2013 101 055 U1 | 9/2013 |
| DE | 10 2012 015 118 B3 | 10/2013 |
| DE | 202015106161 U1 | 1/2016 |
| EP | 1 228 822 B1 | 8/2005 |
| EP | 1 232 810 B1 | 8/2005 |
| JP | 2001-304205 A | 10/2001 |
| JP | 2003-113811 A | 4/2003 |
| JP | 2004-257449 A | 9/2004 |
| JP | 2004257449 A * | 9/2004 |
| JP | 2008-256029 A | 10/2008 |
| KR | 2001-0070715 A | 7/2001 |
| WO | 01/53016 A1 | 7/2001 |

\* cited by examiner

MACHINE TOOL

CROSS REFERENCE TO RELATED APPLICATIONS

This application is a continuation under 35 U.S.C. § 120 of International Application PCT/EP2017/069273, filed Jul. 31, 2017, which claims priority to German Application No. 10 2016 114 635.8, filed Aug. 8, 2016, the contents of each of which are incorporated by reference herein.

FIELD OF THE INVENTION

The present invention relates to a machine tool having at least one tool that can be moved up and down substantially vertically, on which at least one electrohydraulic drive unit acts, comprising a double-acting hydraulic cylinder-piston arrangement oriented in upright manner and having a piston projecting downwardly from the cylinder and being coupled with the tool, a hydraulic-fluid reservoir, a motor-pump unit having an electric motor and a hydraulic pump driven thereby and a valve block flanged to the cylinder at the upper end region of the cylinder and having a servo suction valve.

BACKGROUND

Machine tools of the foregoing class are known for diverse application purposes in the most diverse constructions. A typical area of application are presses with the most diverse functions (e.g. press brakes, straightening presses, forming presses, powder presses, etc.). Via the said servo suction valve, the working chamber of the cylinder-piston arrangement used for pressing is filled during lowering of the tool in the so-called rapid traverse, i.e. before the actual active pressing, wherein especially a separate drive (e.g. a hydraulic cylinder-piston arrangement with relatively small piston cross section) or else the force of gravity may be used for lowering the tool in the rapid traverse. The pertinent prior art is represented, for example, by WO 01/53016 A1, U.S. Pat. No. 6,959,581 B2, CN 204725877 U, EP 1228822 B1, EP 1232810 B1, DE 102012015118 B3 and DE 202015106161 U1.

The present invention has set itself the objective of providing a machine tool of the class according to the preamble of the main claim that is improved in terms of practical utility compared with the prior art.

SUMMARY

This stated object is achieved by the fact that the hydraulic-fluid reservoir is flanged to the valve block at a first hydraulic interface and the hydraulic pump at a second hydraulic interface, wherein a suction line, via which the hydraulic pump sucks in hydraulic fluid from the hydraulic-fluid reservoir during pumping operation, extends from the first hydraulic interface to the second hydraulic interface through the valve block, wherein the suction line is identical in portions to a servo suction line passing through the valve block and placing the hydraulic-fluid reservoir in communication with a piston-side working chamber of the double-acting hydraulic cylinder-piston arrangement. Several advantages with quite considerable practical relevance are derived from this inventive construction of the machine tool. They include in particular the possibility of an especially compact design; in particular, by application of the present invention, machine tools of the class according to the preamble of the main claim may be designed in which the at least one electrohydraulic drive unit needs an especially small overall space. In this respect, one possibility among others is to use, for suction-side fluidic communication of the hydraulic pump with the hydraulic-fluid reservoir, portions of a hydraulic line through the valve block that is present in any case and typically is dimensioned with a relatively large cross section, namely the servo suction line (also comprising the servo suction valve), via which a piston-side working chamber of the double-acting hydraulic cylinder-piston arrangement is in communication with the hydraulic-fluid reservoir. Due to the inventive use of portions of a hydraulic connecting line for several purposes, the necessary overall space may be minimized, wherein the functional reliability even benefits additionally by the double use, since the servo suction line regularly has a particularly large cross section, which typically is noticeably larger than the minimum cross section of the suction line via which the hydraulic pump sucks in hydraulic fluid from the hydraulic-fluid reservoir during pumping operation. Furthermore, the inventive construction of the machine tool favors a modular configuration of the respective drive unit by combination of specific tank-valve block and pump modules, by the fact that it is characterized by flanging of the hydraulic-fluid reservoir as well as the hydraulic pump to the valve block at a first and a second hydraulic interface. Hereby machine tools having at least one electrohydraulic drive unit matched to the respective application environment, ideally adapted thereto (e.g. optimized in terms of function and installation space) can be provided simply and inexpensively. Further advantages resulting from the present invention will become apparent from the explanation thereof hereinafter.

In a preferred further development of the present invention, the first and the second hydraulic interfaces—in a typical installation situation for the at least one electrohydraulic drive unit—are positioned relative to one another in such a way that the hydraulic-fluid reservoir and the hydraulic pump are flanged to the valve block in a manner disposed opposite one another, or else the hydraulic-fluid reservoir and the hydraulic pump are flanged via a corner to the valve block. If an atypical installation exists, however, placement of the hydraulic-fluid reservoir and the hydraulic pump relative to the valve block in a manner differing from the foregoing may also prove advantageous in the individual case.

Another preferred further development of the invention is characterized in that the first interface is constructed as an SAE flange. This permits, in the individual case, the hydraulic-fluid reservoir to be placed apart from the valve block, wherein in this case a suction hose discharging into the hydraulic-fluid reservoir may be attached in standard manner to the first hydraulic interface of the valve block.

During implementation of the present invention, it can be achieved that the maximum overall height of the motor pump unit and the maximum overall height of the hydraulic-fluid reservoir do not exceed the overall height of the valve block. This is of quite special importance for the practical utility of the inventive machine tool, since the overall height of the machine tool—for example during transportation of the machine from the manufacturer to the user and during installation of the machine tool there—is often a critical factor.

According to yet another preferred further development of the invention, further hydraulic valves that can be activated by a machine controller are mounted in the valve block. This is favorable in terms of a particularly compact construction of the at least one electrohydraulic drive unit. In addition, the efficiency of the machine tool may benefit from the particularly short and therefore low-loss hydraulic lines that can be realized in this case. On the other hand, however, the advantages of an alternative preferred further development, which is characterized in that a function block having further hydraulic valves that can be activated by a machine controller is flanged to the valve block at a third hydraulic interface, may predominate. Here, the modular concept already mentioned hereinabove and associated with special advantages may be extended to the entirety of the electrohydraulic drive unit, by the fact that the function block comprising hydraulic valves that can be activated by a machine controller forms a further module, which can be combined arbitrarily with the further modules (see above). Furthermore, it is conceivable to mount all or at least part of the hydraulic valves that can be activated by a machine controller in the pump housing of the hydraulic pump.

As regards configurability that is as free and flexible as possible for an electrohydraulic drive unit adapted individually to the mechanical environment, it may be further advantageous when the valve block can be installed in several different angular positions, for example two turned by 180° relative to one another, on the cylinder of the hydraulic cylinder-piston unit.

In a preferred further development of the present invention, the motor-pump unit is oriented—with horizontal axis of the electric motor disposed next to the hydraulic pump—horizontally or else—with vertical axis of the electric motor disposed underneath the hydraulic pump—in upright manner in typical installation situations for the at least one electrohydraulic drive unit. Both concepts permit keeping the overall height of the machine tool low, by the fact that the maximum overall height of the motor-pump unit does not exceed the overall height of the valve block (see above). In other respects, the motor-pump unit, in yet another preferred further development, has a specific adapter flange disposed between the pump housing of the hydraulic pump and the electric motor. Such a separate adapter flange is of advantage in particular with respect to the possibility of combining various hydraulic pumps and electric motors freely with one another for modular configuration of the respective motor-pump unit in a manner specific to the individual application.

In yet another preferred further development of the invention, the electrohydraulic drive unit has a pressure filter, which on the pressure side continuously cleans the hydraulic fluid being conveyed through the hydraulic pump. This acts positively on the functional reliability.

BRIEF DESCRIPTION OF THE DRAWING

The present invention will be explained in more detail hereinafter on the basis of a preferred exemplary embodiment illustrated—only in the scope of interest here—in the drawing, wherein.

DETAILED DESCRIPTION OF THE PREFERRED EMBODIMENTS

Figure 1:
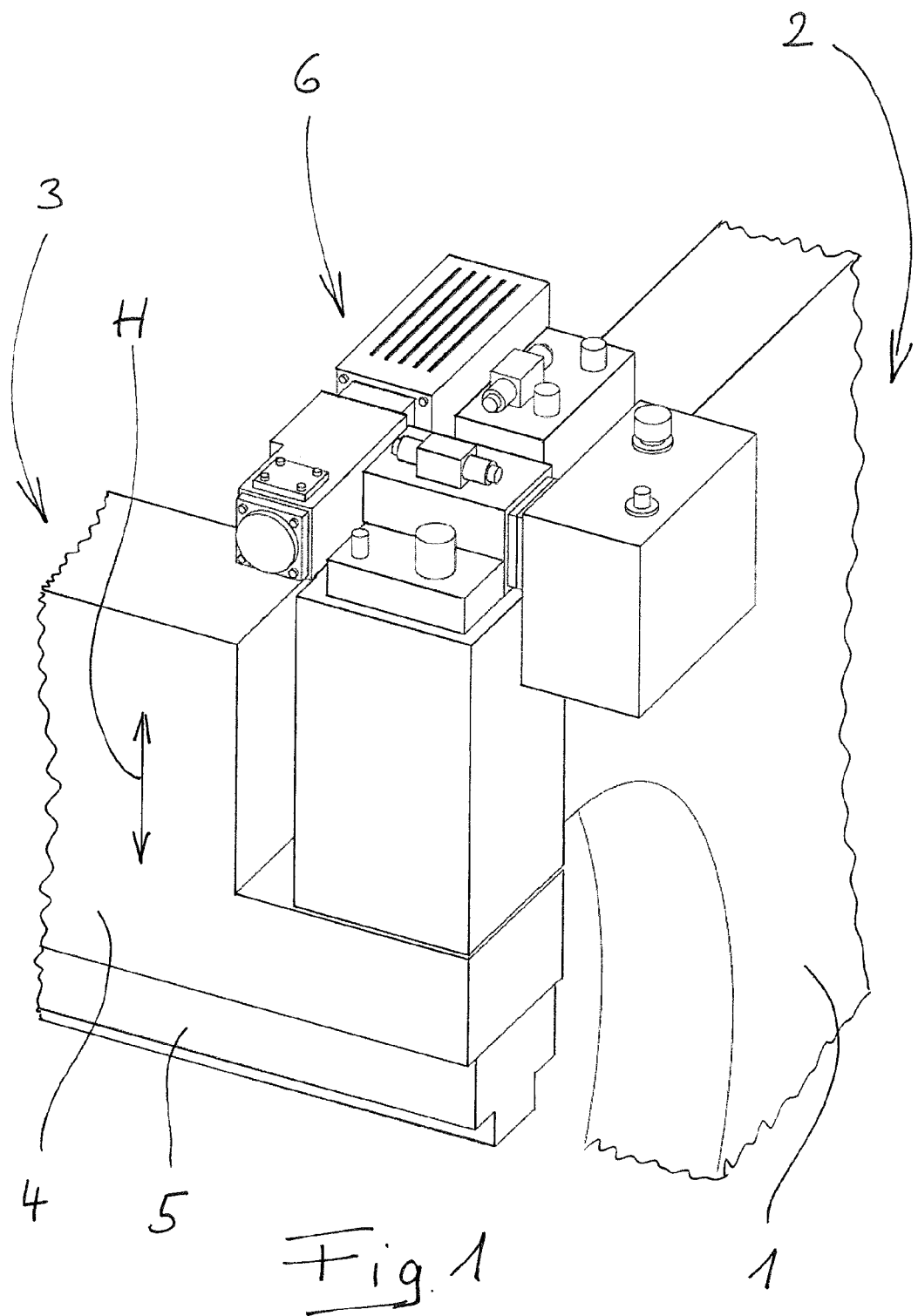
FIG. 1 shows, in a perspective diagram, the right upper corner region of a machine tool constructed according to the invention in the form of a press brake provided with two electrohydraulic drive units.

The machine tool, illustrated in the drawing and constructed as a press brake, is provided in a manner known in itself with a machine chassis 2 comprising two C frames 1. Thereon, a lower tool (not shown, but comprising a lower tool carrier and a lower tool attachment mounted exchangeably thereon) is disposed in fixed spatial relationship to machine chassis 2, namely in a manner fixed respectively on a lower profile branch of the two C frames 1. Relative to the lower tool carrier, an upper tool 3 (comprising an upper tool carrier 4 and an upper tool attachment 5 mounted exchangeably thereon) can be moved up and down linearly in vertical manner by an operating stroke H; for this purpose, an electrohydraulic drive unit 6 is mounted on each of the two C frames (at the end face on an upper profile branch). In FIG. 1, upper tool 3 is shown in its uppermost, maximally raised position. Since the press brake shown in the drawing corresponds to this extent to the sufficiently known prior art, further explanations in this respect are superfluous; instead, reference is made to the prior art specified in the introduction, wherein the entire substance of the cited publications is incorporated by reference in the content of the present patent application.

Figure 2:
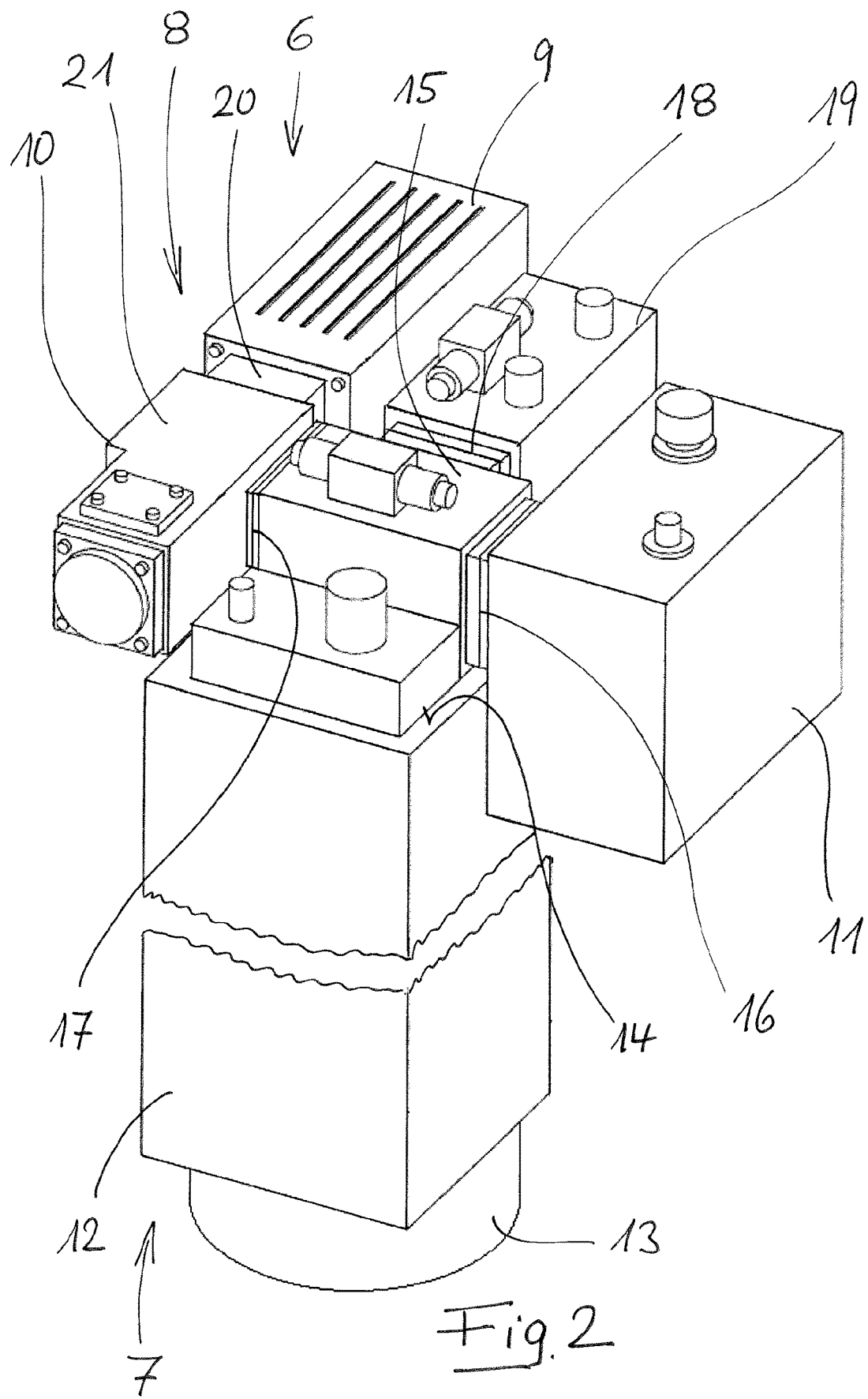
FIG. 2 shows, in an enlarged view, the electrohydraulic drive unit used in the press brake according to FIG. 1.

According to the drawing, especially FIG. 2 thereof, each of the two electrohydraulic drive units 6 comprises a double-acting hydraulic cylinder-piston arrangement 7, a motor-pump unit 8 having a hydraulic pump 10 driven by an electric motor 9 and a hydraulic-fluid reservoir 11. Hydraulic cylinder-piston arrangement 7 is disposed in upright manner together with a cylinder 12 joined in fixed manner to associated C frame 1 and a piston 13, which projects downwardly from this and is coupled to upper tool 3.

Figure 3:
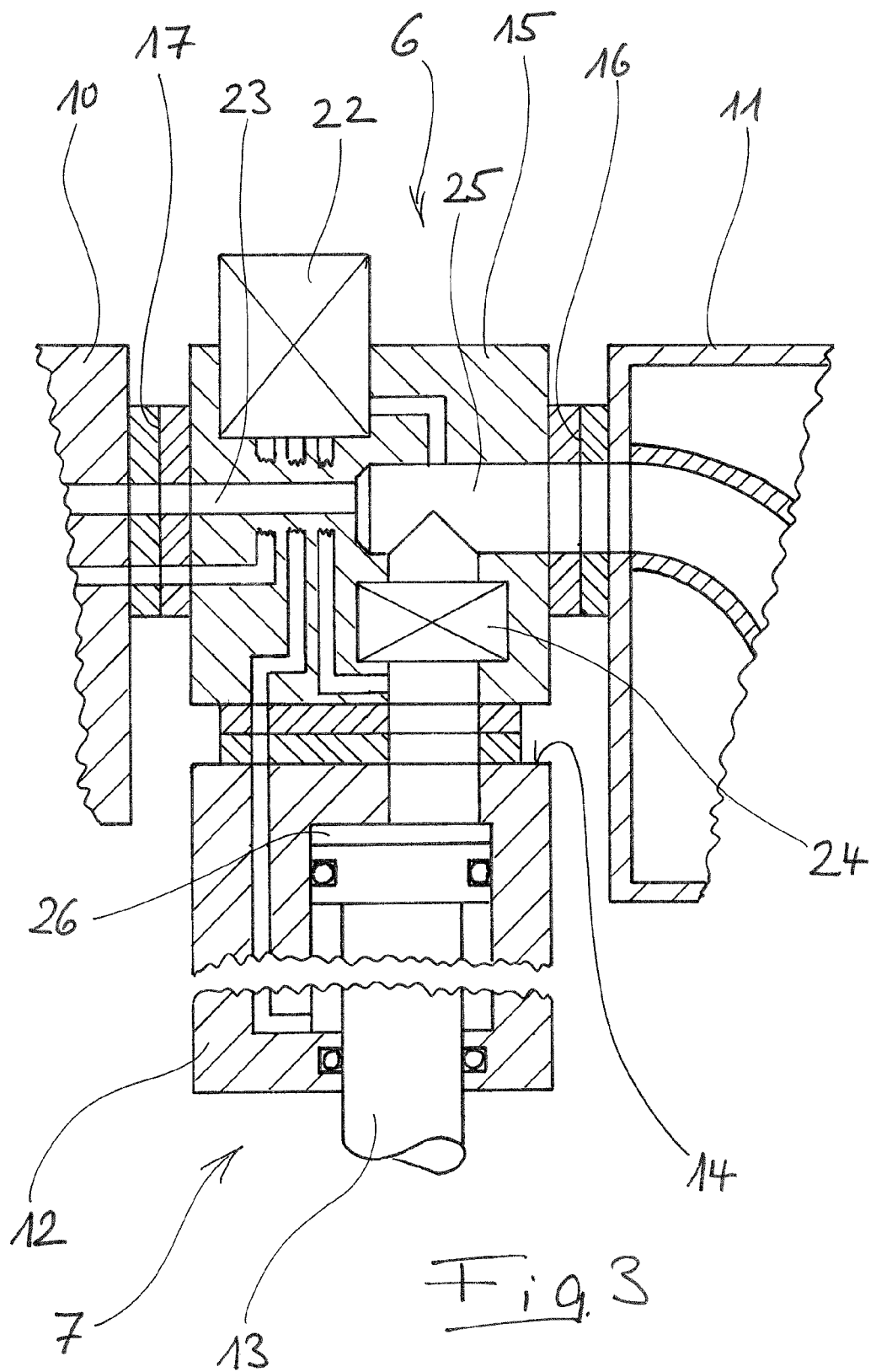
FIG. 3 shows, in schematic view, a section through the drive unit according to FIG. 2.
Figure 4A:
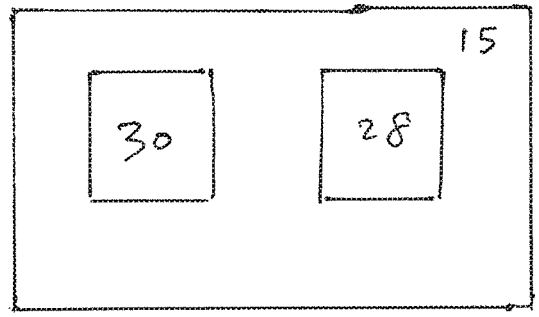
FIGS. 4A-4C show, in nested block diagrams, a section of the drive unit.
Figure 4B:
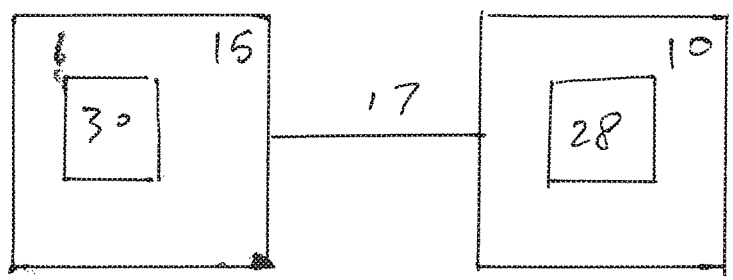
Figure 4C:
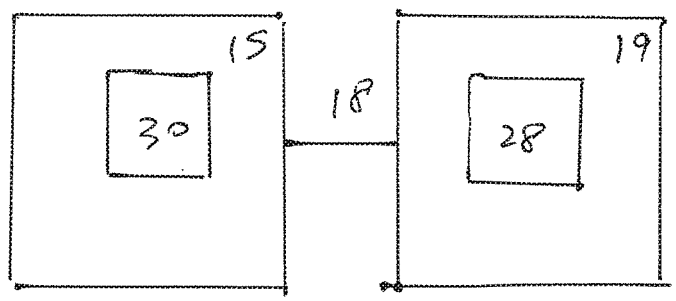

A valve block 15 having a servo suction valve is flanged to cylinder 12 of hydraulic cylinder-piston arrangement 7 at the top on its upper end face 14. Valve block 15 has several flange-like hydraulic interfaces. A first hydraulic interface 16, which is constructed in the form of an SAE flange, is used as the port of hydraulic-fluid reservoir 11; this is flanged to valve block 15 at first hydraulic interface 16. Opposite first hydraulic interface 16, valve block 15 has a second hydraulic interface 17, which serves as the port of motor-pump unit 8. Hydraulic pump 10 of motor-pump unit 8 is flanged to valve block 15 at second hydraulic interface 17 thereof, in a manner disposed opposite hydraulic-fluid reservoir 11. A third hydraulic interface 18 disposed on a further side of valve block 15 is used as the port of a function block 19 having further hydraulic valves 28 that can be activated by a machine controller 30 on valve block 15; the function block is flanged to valve block 15 at third hydraulic interface 18 thereof. As illustrated by way of example by control valve 22 (FIG. 3), which induces pressurization of the two working chambers of cylinder-piston arrangement 7 by motor-pump unit 8, further hydraulic valves 28 that can be activated by a machine controller 30 are mounted in valve block 15 itself.

A suction line 23, via which hydraulic pump 10 sucks hydraulic fluid from hydraulic-fluid reservoir 11 during pumping operation, extends through valve block 15, from first hydraulic interface 16 to second hydraulic interface 17. Suction line 23 is identical in portions, namely in the first region connected to first hydraulic interface 16, with servo suction line 25 (which also comprises servo suction valve 24), which likewise passes through valve block 15, namely extends from first hydraulic interface 16 up to the flange face joined to cylinder 12 of double-acting cylinder-piston arrangement 7, and from there further through cylinder 12 up to piston-side working chamber 26 of piston-cylinder arrangement 7.

The said components, explained in the foregoing, of electrohydraulic drive unit 6 are dimensioned and disposed relative to one another in such a way that neither the maximum overall height of motor pump unit 8 nor the maximum overall height of hydraulic-fluid reservoir 11 exceeds the overall height of valve block 15. A horizontal installation position of motor-pump unit 8 contributes to this; i.e. the motor-pump unit is oriented horizontally with horizontal axis of electric motor 9 disposed next to hydraulic pump 10.

In other respects, the motor-pump unit comprises an adapter flange 20. This is disposed between pump housing 21 of hydraulic pump 10 and electric motor 9, so that electric motor 9 is not joined directly and without intermediate means to pump housing 21 but instead indirectly via the said adapter flange 20. A seat for a pressure filter, which constantly cleans the hydraulic fluid being conveyed through hydraulic pump 10 on the pressure side thereof, is constructed in pump housing 21 of hydraulic pump 10.

Solely to prevent a misinterpretation of the foregoing explanation of a preferred exemplary embodiment of the invention, it is pointed out that the invention also comprises such machine tools that are equipped with only one electrohydraulic drive unit 6 of the design that is definitive here.

What is claimed is:

1. A machine tool having at least one tool that can be moved up and down substantially vertically, on which at least one electrohydraulic drive unit acts, comprising:
    a double-acting hydraulic cylinder-piston arrangement oriented in upright manner and having a piston projecting downwardly from the cylinder and being coupled with the tool,
    a hydraulic-fluid reservoir,
    a motor-pump unit having an electric motor and a hydraulic pump driven thereby, and
    a valve block flanged to the cylinder at an upper end region of the cylinder and having a servo suction valve,
    wherein the hydraulic-fluid reservoir is flanged to the valve block at a first hydraulic interface and the hydraulic pump is flanged to the valve block at a second hydraulic interface, wherein a suction line, via which the hydraulic pump sucks in hydraulic fluid from the hydraulic-fluid reservoir during pumping operation, extends from the first hydraulic interface to the second hydraulic interface through the valve block (15), wherein the suction line is identical in portions to a servo suction line passing through the valve block and placing the hydraulic-fluid reservoir in communication with a piston-side working chamber of the double-acting hydraulic cylinder-piston arrangement.

2. The machine tool of claim 1, wherein the first and the second hydraulic interfaces are positioned relative to one another in such a way that the hydraulic-fluid reservoir and the hydraulic pump are flanged to the valve block in a manner disposed opposite one another.

3. The machine tool of claim 1, wherein the hydraulic-fluid reservoir and the hydraulic pump are flanged via a corner to the valve block.

4. The machine tool of claim 1, wherein the first interface is constructed as an SAE flange.

5. The machine tool of claim 1, wherein the maximum overall height of the motor-pump unit does not exceed the overall height of the valve block.

6. The machine tool of claim 1, wherein the maximum overall height of the hydraulic-fluid reservoir does not exceed the overall height of the valve block.

7. The machine tool of claim 1, wherein further hydraulic valves that can be activated by a machine controller are mounted in the valve block.

8. The machine tool of claim 1, wherein further hydraulic valves that can be activated by a machine controller are mounted in a pump housing of the hydraulic pump.

9. The machine tool of claim 1, wherein a function block having further hydraulic valves that can be activated by a machine controller is flanged to the valve block at a third hydraulic interface.

10. The machine tool of claim 1, wherein the motor-pump unit is oriented horizontally with horizontal axis of the electric motor disposed next to the hydraulic pump.

11. The machine tool of claim 1, wherein the motor-pump unit is oriented in upright manner with vertical axis of the electric motor disposed underneath the hydraulic pump.

12. The machine tool of claim 1, wherein the motor-pump unit comprises an adapter flange disposed between a pump housing of the hydraulic pump and the electric motor.

13. The machine tool of claim 1, wherein a pressure filter for the hydraulic fluid being conveyed is mounted in a pump housing of the hydraulic pump.

* * * * *